Nov. 27, 1951                J. R. STOVALL, JR                2,576,489
                        CAPACITANCE STRAIN GAUGE
                          Filed Jan. 20, 1950

Inventor
John R. Stovall Jr.
By
Attorneys

Patented Nov. 27, 1951

2,576,489

UNITED STATES PATENT OFFICE 2,576,489

CAPACITANCE STRAIN GAUGE

John R. Stovall, Jr., Doylestown, Pa., assignor to Tinius Olsen Testing Machine Company, Willow Grove, Pa., a corporation of Pennsylvania Application January 20, 1950, Serial No. 139,562

6 Claims. (Cl. 175—41.5)

This invention relates to capacitance type strain gages.

The present invention contemplates a form of capacitance strain gage incorporating features adapted to augment or multiply change in capacity in relation to strain of the test piece.

Briefly described, according to the present invention the increase in percent capacity change in relation to percent strain is accomplished without relying upon relative shifting movement of the plates as a whole with relation to each other when the test piece is strained. The gage of the invention incorporates a pair of superimposed condenser plates one of which is provided with crimps or flutes, with the valleys of the crimps or flutes secured to the other plate, so that the two plates as a whole constitute a unitary structure adapted to be pasted or otherwise adhesively secured to the test piece and therefore subject to be strained along with the test piece. The crimps or flutes of said one plate of the gage are so arranged as to bring about a change in interplate spacing in the regions intermediate the points of attachment of the crimps or flutes to the other plate.

The foregoing results in a gage structure which is of unitary or integral physical form, thus avoiding the problem of maintaining the spacing of two plates or the pressure between plates. Further, it has the desirable characteristic of accentuating the percent capacity change in relation to the percent strain. This is important in a capacitance type strain gage in order to extend the range of capacity variation and thus simplify and render more accurate the measurement of the capacity change and thus the strain of the piece.

How the foregoing and other objects and advantages are attained will be clear from the following description referring to the accompanying drawings, in which.

Figure 1:
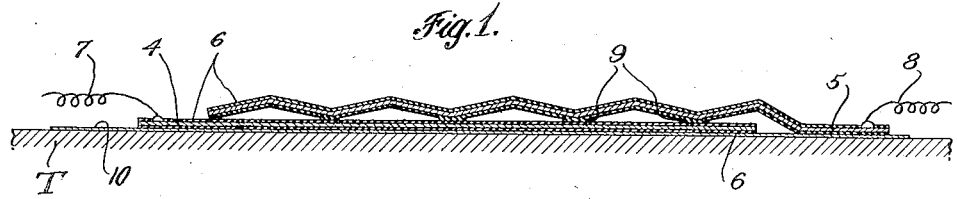
Figure 1 is a vertical sectional view through one form of gage constructed according to the invention.
Figure 2:
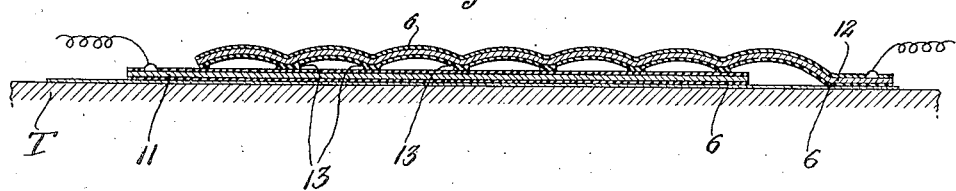
Figure 2 is a view similar to Figure 1 but illustrating a modified arrangement.

In considering the drawing it is first pointed out that in general the gage is often of strip-like shape and small size, for instance a strip about 1" long (i. e., in the direction from left to right in Figure 1) and about ⅜" wide (i. e., the dimension in a direction perpendicular to the plane of the drawing). It may further be mentioned that the proportions of thicknesses of gage plates and dielectric layers and the like as shown in Figures 1 and 2 is not intended to accurately represent those dimensions. Such dimensions are exaggerated in the drawings for purposes of illustration.

Referring to Figure 1, the gage is shown as mounted upon a piece to be tested, as indicated at T. The gage comprises a pair of condenser plates 4 and 5, preferably each of which is provided with coatings of insulating material shown at 6, preferably a dielectric material having appropriate dielectric properties. Leads such as shown at 7 and 8 are provided for connection of the gage with a measuring circuit.

In the form of Figure 1, the bottom plate 4 of the gage takes the form of a simple flat strip and the plate 5 is of similar plan pattern but is angularly crimped, with the valleys resting upon the lower plate. These valleys are secured to the lower plate as by an adhesive material, for example, a heat seal of a thermoplastic dielectric, forming small fillets indicated at 9.

The gage as a whole is also preferably adhesively secured to a mounting strip, such as a strip of paper 10 having marginal edges projecting at all sides of the gage for convenience in pasting the gage to the test piece. Such a paper strip may also contribute strength to the structure.

With the valleys of the upper plate connected with the lower plate as by the fillets 9, the gage constitutes an integral unit which is adapted to be strained along with the test piece on which it is mounted. When the gage is strained along with the test piece, the spacing of the upper plate from the lower plate in the regions intermediate the points of connection with the lower plate is altered. This alteration is dependent in part upon the angle of crimping, and with a relatively great crimp angle (i. e., the angle between the oppositely inclined sections of the crimped plate), the variation in plate spacing is relatively great in relation to percent strain. Advantageously the crimp angle, i. e., the included angle at any trough of the crimping, is at least 140°, although it should not be greater than about 172° or 174°, due to the incidence at these angles of high tensile forces and departure from what might be called "hinged plate" action.

It will be seen from the above that the desired characteristics of the gage are obtained because of the plate crimping. Although both plates may be crimped and interconnected at the crimp apexes, it is of advantage for purposes of mounting the gage that the lower plate be flat as is shown in Figure 1.

The arrangement of Figure 2 is similar to that of Figure 1 but is of advantage over the arrangement of Figure 1 since it provides a more linear response in percent capacity change in relation to percent strain. In Figure 2 the two plates 11 and 12 are again provided with dielectric coatings such as indicated at 6, but the crimping of the upper plate is here formed as semi-cylindrical flutes the arc of which is advantageously limited to that which may be subtended by less than 4/5 of the radius of the flute curvature. With the upper plate connected at the valleys with the lower plate as by fillets 13, the arrangement provides for substantial augmentation of the capacity change in relation to percent strain, while also materially improving the linearity of response. This is due to the apparent fact that for the gage of Figure 1, the plate is a cosine function of strain, whereas the flutes of Figure 2 have a different form of response with less acceleration of plate approach with strain increase. This is less simply expressed mathematically than seen empirically.

The condenser plate elements of the gages described above may conveniently be formed of metal foil, for instance aluminum, zinc or tin foil of thickness ranging from about 0.0005" to about 0.003", about 0.001" being suitable.

The insulating or dielectric material may comprise any of a variety of resin type materials, advantageously a resin which may be heat bonded, for example, thermoplastic and thermosetting resins, such as polyvinyl chloride, copolymers of vinyl chloride with other vinyl resins, such as vinyl acetate and vinylidene chloride. Still other materials such as polyethylene may be used.

Figure 3:
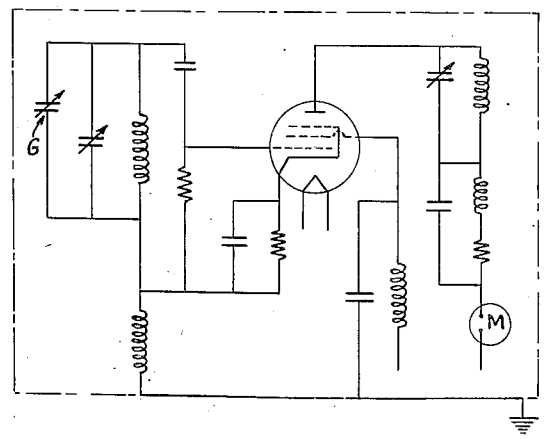
Figure 3 is a schematic diagram of a circuit of a type with which the gages of the present invention are usable.

In Figure 3 there is illustrated one form of measuring circuit with which gages of the kind described above may be used. The special features of this circuit need not be considered in detail herein although it may be mentioned that the gage itself may be coupled thereto in the position of the condenser element indicated at G. A meter such as a milliammeter shown at M in Figure 3 may be calibrated in units of strain.

I claim:

1. A capacitance strain gage comprising a pair of plate elements electrically insulated from one another but interconnected at two separate points lying in a plane, the portions of the plate elements at the points of interconnection being in fixed, abutting relationship, a portion of one of said plates between said points being displaced from said plane in a direction generally perpendicular to said plane, and a portion of the other plate between said points being capable of elongation.

2. A gage according to claim 1, in which said one plate is crimped to provide a series of alternating peaks and valleys, and in which the points of interconnection to said plate are located at said valleys.

3. A gage according to claim 2 in which the crimped plate is mounted in confronting relationship to the other plate and in which said other plate is flat.

4. A gage according to claim 2 in which the crimping of the crimped plate comprises angular crimps having an included angle of from 140° to 174°.

5. A gage according to claim 2 in which the crimping of the crimped plate takes the form of a series of flutes of cylindrical section.

6. A gage in accordance with claim 5, in which the arc of said section is less than that subtended by four-fifths of the radius thereof.

JOHN R. STOVALL, Jr.

REFERENCES CITED

The following references are of record in the file of this patent:

UNITED STATES PATENTS

| Number | Name | Date |
|---|---|---|
| 1,740,131 | Werner | Dec. 17, 1929 |
| 2,363,181 | Howland | Nov. 21, 1944 |